(No Model)

C. E. TROWBRIDGE.
BOX FOR HOLDING TRAVELERS, &c.

No. 583,777. Patented June 1, 1897.

Witnesses:
A. C. Harmon
Thomas J. Drummond

Inventor:
Charles E. Trowbridge
by Crosby & Gregory
Attys.

UNITED STATES PATENT OFFICE.

CHARLES E. TROWBRIDGE, OF WHITINSVILLE, MASSACHUSETTS, ASSIGNOR TO THE WHITINSVILLE SPINNING RING COMPANY, OF SAME PLACE.

BOX FOR HOLDING TRAVELERS, &c.

SPECIFICATION forming part of Letters Patent No. 583,777, dated June 1, 1897.

Application filed November 19, 1896. Serial No. 612,673. (No model.)

*To all whom it may concern:*

Be it known that I, CHARLES E. TROWBRIDGE, of Whitinsville, county of Worcester, State of Massachusetts, have invented an Improvement in Boxes for Holding Travelers, &c., of which the following description, in connection with the accompanying drawings, is a specification, like letters and figures on the drawings representing like parts.

This invention has for its object the production of a box for holding travelers for use in connection with ring-spinning frames.

In the use of ring-spinning frames the travelers have frequently to be replaced to provide against breakage, wear, &c., and said travelers are placed in a small box with vertical sides, and in taking out the travelers, which are quite small, they are frequently lost.

To make a box from which the travelers may be easily taken without the liability of being dropped, I have made the box with a rounded bottom, and I have provided the box with a cover which normally remains closed, and the box has a shank by which it may be attached to the spinning-machine frame, so that it is always convenient.

Figure 1:
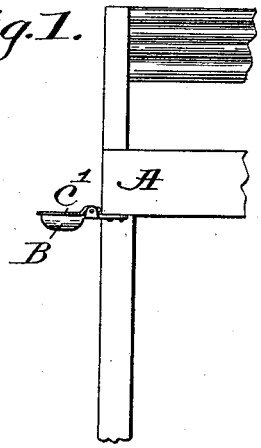
Figure 2:
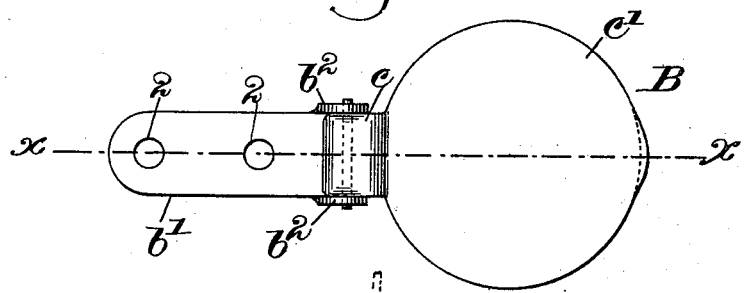
Figure 3:
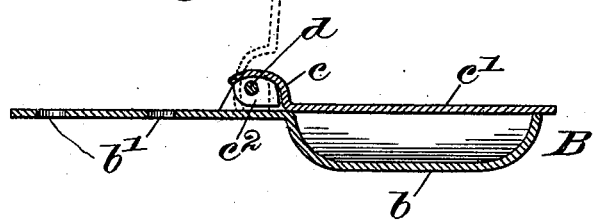

Figure 1 shows part of a spinning-frame with one of my improved boxes attached thereto. Fig. 2 is a top view of the box detached; and Fig. 3 is a section on the line $x$, Fig. 2, the dotted lines showing the lid or cover of the box lifted.

A represents part of a spinning-frame of any usual construction, and B my improved box attached thereto. The box is composed of a concavo-convex dish $b$, having a shank or handle $b'$, provided with ears $b^2$, the said shank having suitable screw-holes 2 to receive screws by which to attach the box in the place desired. The box $b$, its handle and ears, will preferably be struck up from sheet metal in one single piece by the ears being turned up, as shown, to receive between them the shank $c$ of the lid or cover $c'$. The cover $c'$ is shown as cut from sheet metal with an attached shank $c$, said shank being shown as having at its sides two ears $c^2$, the ears $b^2$ and $c^2$ being provided with holes for the reception of a rivet or pin $d$ to serve as a pivot for the said lid or cover, the end of the shank $c$ of the cover when the latter is elevated meeting the shank $b'$ and serving as a stop to prevent further lifting of the lid or cover. The shank $c$ is of such length as to meet the shank $b'$ before the lid or cover is brought into a vertical position, and consequently said lid will automatically close itself whenever the hand is removed from it.

Having described my invention, what I claim, and desire to secure by Letters Patent, is—

As an article of manufacture, a box, concave on its inside, said box having an integral rearwardly-extended shank $b'$ adapted to be secured to a spinning-frame and provided immediately at the box with opposite parallel ears $b^2$, and a cover having a rear extension $c$, arched upwardly and over rearwardly, said shank having the same width as said extension, and its rearward arch being provided with opposite parallel ears $c^2$ depending snugly between the ears $b^2$, and a pivot-pin $d$ connecting said ears, said extension projecting to the rear of said pin to abut against said shank as shown when the lid is lifted to cause said lid to automatically close itself, substantially as described.

In testimony whereof I have signed my name to this specification in the presence of two subscribing witnesses.

CHARLES E. TROWBRIDGE.

Witnesses:
 A. S. NOYES,
 GEO. B. HAMBLIN.